United States Patent Office 3,287,444
Patented Nov. 22, 1966

3,287,444
PRODUCTION OF THERMOPLASTIC
POLYMERIC MATERIALS
Kenneth Stafford Ennor, Welwyn, and Brian Philip Griffin, Welwyn Garden City, England, assignors to Imperial Chemical Industries Limited, London, England, a corporation of Great Britain
No Drawing. Filed Dec. 3, 1962, Ser. No. 241,567
Claims priority, application Great Britain, Dec. 28, 1961, 44,008/61
1 Claim. (Cl. 260—879)

The present invention relates to improvements in the production of thermoplastic polymeric materials, particularly in the production of polymeric materials derived mainly from methyl methacrylate.

Polymethyl methacrylate is widely used in the form of granules or moulding powder to manufacture useful articles by, for example, injection or extrusion moulding processes. Among the many articles which may be made from this material are, for example, reflex reflectors, rear lamp housings for motor vehicles, telephones, implosion guards for television tubes, vacuum jugs, fountain pens and lighting fittings. Articles such as these moulded from polymethyl methacrylate granules or moulding powders are widely used at the present time and give extremely satisfactory service.

Polymethyl methacrylate is a particularly useful material to use for the manufacture of articles of this kind because it is easily moulded, can be attractively coloured, is strong, and does not discolour readily when exposed to sunlight. For certain applications a higher resistance to impact would be an advantage. Also, if certain liquids are brought into contact with articles made from polymethyl methacrylate the phenomenon of surface crazing may appear and the surface becomes covered with very fine lines. Some organic solvents induce this phenomenon, as also may repeated exposure to aqueous detergents or even warm water. In view, therefore, of the considerable technical merits of polymethyl methacrylate as a material for making moulded articles of great utility, it would be an advantage if the tendency to craze under certain conditions could be completely eliminated, or at least, reduced.

An object of this invention is to provide a process whereby polymethyl methacrylate granules or moulding powders may be made which have an improved resistance to breakage on impact. It is a further object to provide polymethyl methacrylate granules or moulding powders which may be moulded to form articles having a reduced tendency to craze on exposure to aqueous detergents.

According to the present invention, we provide a suspension polymerisation process in which methyl methacrylate alone or as a mixture with another monoethylenically unsaturated monomer copolymerisable therewith in which the methyl methacrylate forms more than 60% by weight of the mixture which mixture when polymerised alone forms a hard rigid copolymer, is maintained as a dispersion by stirring in an aqueous phase containing a dispersing agent, and there is also present in intimate contact with the dispersed monomeric constituents of the system a polymeric material which is selected from the group consisting of polybutadiene, rubbery copolymers of butadiene 1,3 with copolymerisable monoethylenically unsaturated monomers, lower alkyl acrylate homopolymers and copolymers of lower alkyl acrylates each derived from alkyl acrylates containing not more than 8 carbon atoms in the alkyl moiety of the ester molecule with copolymerisable monoethylenically unsaturated monomers and ethylene copolymers as hereinafter defined, said polymeric material forming less than 50% by weight of the combined weights of the said polymeric material, methyl methacrylate and other monoethylenically unsaturated monomer if present, and maintaining the methyl methacrylate and other monomer, if present, while so dispersed under polymerisation conditions until polymerisation of the monomers is substantially complete.

Other monoethylenically unsaturated monomers that may be used together with methyl methacrylate include for example, styrene and nuclear substituted alkyl and halo-styrenes, e.g. α-methyl styrene, orthochlorostyrene, 2-chloro-2-methylstyrene, nitriles and amides of acrylic and methacrylic acids and lower alkyl esters of acrylic and methacrylic acid, e.g. ethyl and methyl acrylates. Any one or any mixture of these compounds may be copolymerised with methyl methacrylate. We prefer that the polymerisable constituents of the reaction mixture should consist of methyl methacrylate with from 0 to 10% of its weight of ethyl acrylate, because the polymeric products thus obtained have the moulding properties required for conventional moulding apparatus.

Synthetic rubbers which are copolymers of butadiene 1, 3 are well known and in general include copolymers with acrylonitrile, styrene, or methyl methacrylate. The weight of the comonomer is normally less than the weight of the butadiene 1, 3, although for some purposes copolymers of butadiene, 1,3, although for some purposes copolymers of butadiene 1, 3 with a larger amount by weight of the comonomer may be used. A synthetic rubber which is particularly suitable for use in our process is one derived from a mixture of butadiene 1, 3 and acrylonitrile and containing from 30 to 40% by weight of acrylonitrile.

The lower alkyl acrylates to be used in our process are particularly the esters of acrylic acid with alcohols containing from one to four carbon atoms, and copolymers of these esters, with up to 50% by weight of the alkyl acrylate of other monoethylenically unsaturated compounds e.g. vinyl acetate, acrylonitrile, 2-chloromethyl vinyl ether, 2-chloroethyl vinyl ether or 3-chloropropyl acrylate. The comonomer used should not normally form more than 5% by weight of the copolymer, although in the case of acrylonitrile up to 20% can be usefully employed.

The copolymers of ethylene that may be used in our process are those obtained by polymerising ethylene together with a compound represented by the formula:

(A) 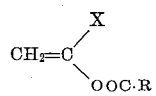

where X may be hydrogen or an alkyl group and R is an aromatic or aliphatic hydrocarbon radical with from 1 to 8 carbon atoms or (B) with a monoethylenically unsaturated compound in which at least one of the free valencies of the >C=C< group is satisfied by a monovalent radical having the formula —CN or —COOR where R is hydrogen or a monovalent hydrocarbon radical or in which a free valency on one carbon atom and a free valency on the other carbon atom of said group are together satisfied by the divalent radical having the formula —CO—O—OC— and in which at least two of the remaining valencies of said group are attached to hydrogen atoms, the polymerisation products of ethylene with the compounds of either A or B containing from 7 to 95% by weight of units of the monoethylenically unsaturated compound. Copolymers which are particularly useful in imparting good craze resistance to polymethyl methacrylate are those containing from 15% to 75% by weight of the monoethylenically unsaturated compound.

Examples of compounds that may be copolymerised with ethylene to form polymeric materials that may be used in our process include: vinyl acetate, vinyl propionate, vinyl benzoate, isopropenyl acetate, methyl acrylate, ethyl acrylate, butyl acrylate, iso-amyl acrylate, 2-ethyl-hexyl acrylate, methyl methacrylate, acrylonitrile, acrylic acid, dimethyl maleate, diethyl maleate, dimethyl fumarate, diethyl fumarate, maleic acid, maleic anhydride, fumaric acid and methyl α-chloro-acrylate. Particularly preferred compounds are vinyl acetate and methyl methacrylate.

Suspension polymerisation is a process well known in the polymer art and normally consists in dispersing a liquid monomer in an aqueous phase with stirring to form a dispersion of monomer droplets in the aqueous phase. The suspension is normally stabilised by the presence of a dispersing agent, examples of which include gelatin, starch, methyl cellulose, polyvinyl alcohol, salts of polyacrylic and polymethacrylic acids and certain inorganic colloidal materials e.g. hydrated magnesium silicates. Catalysts that are soluble in the monomer are also used, examples of which include benzoyl peroxide, lauroyl peroxide and the azo caatlysts of which $\alpha\alpha'$-azodiisobutyronitrile is an example.

The polymerisation mixture is contained in a stirred reaction vessel which may be sealed or left open to the atmosphere in which case a reflux condenser should be used, and heated to the desired reaction temperature. The process may be carried out, for example, at temperatures of 40–140° C., the most useful range for convenience and speed being from 70 to 90° C.

The amount of the polymer used in our process will be determined by the polymer itself and the purpose for which the final product is intended. Thus the products may range from materials that are essentially slightly modified polymethyl methacrylates where small amounts of the polymer are present, up to high impact resistant thermoplastic moulding compositions containing much higher proportions of the polymer. In the case of the butadiene polymers, useful effects are obtained when from 5–15% of the polymer is used. In the case of the polyalkyl acrylate and the ethylene copolymers, somewhat higher proportions are normally nedeed to obtain equivalent effects, normally from 10 to 25%.

Other ingredients may also be added to the reaction mixture at any convenient stage, for example in order to control the molecular weight of the final polymer it may be desired to carry out the polymerisation reaction in the presence of a known chain transfer agent. Other ingredients that may be added to the reaction mixture include, for example, components such as stearic acid or stearyl alcohol which have a favourable effect upon the moulding properties of the final polymer.

Antioxidants, and ultra-violet light absorbing materials may also be added at this stage, although they may be added together with other additives e.g. pigments at any convenient later stage in the process. It is also advantageous to add water soluble polymerisation inhibitors to prevent aqueous phase polymerisation, e.g. sodium thiosulphate, or potassium thiocyanate. The presence of very small polymer particles in the final product may also be prevented by the presence of latex coagulating agents during the process, e.g. aluminium sulphate or calcium chloride.

The monomeric ingredients of the reaction mixture may be brought into intimate contact with the added polymer by various methods. For example, the polymer may be dissolved or dispersed in the liquid monomer and this solution or dispersion may be then dispersed as droplets in the aqueous phase of the reaction mixture. Alternatively, the polymer in the form of a stable aqueous latex may be selected and the methyl methacrylate with, if desired, additional monomeric material may be dispersed in this latex by stirring and with the assistance of a dispersing agent to form a dispersion which can then be subjected to heat as hereinbefore described in order to effect polymerisation of the monomeric ingredients. This latter method has the particular advantage that it is possible to use, for example, a synthetic rubber without first isolating the rubber from the latex, and that the intimate admixture of monomer and synthetic rubber in suspension in the aqueous phase is particularly easily obtained. In a preferred form of our suspension process, therefore, we select a latex containing a polymer as hereinbefore described and we disperse in said latex methyl methacrylate or a mixture of methyl methacrylate with a monoethylenically unsaturated monomer with agitation to form a dispersion therein in the presence of a dispersing agent and maintain the dispersion at a temperature of 40 to 140° C. preferably 70–90° C., until substantially all the material has been converted to polymer.

We prefer that the synthetic rubber used in our process should be one that contains a high proportion of gel because the use of such high gel content rubbers leads to the production of polymeric moulding materials which, upon subsequent processing by such methods as injection or extrusion moulding, give products with a particularly good surface finish. By high gel content we mean a synthetic rubber at least 50% of which is insoluble in methyl ethyl ketone at 20° C. for 24 hours. We prefer that the gel content should be not less than 60%. Synthetic rubbers as normally made do not have high gel contents. The gel content of a synthetic rubber, however, can be increased quite easily by, for example, taking the polymerisation process by which the rubber is made to a high degree of conversion. An alternative method is to polymerise the monomeric ingredients that form the rubber in the presence of a copolymerisable cross-linking agent of known kind, e.g. divinyl or trivinyl benzene, normally in an amount which is about 1.0% of the polymerisable mixture. It is to be understood therefore, that while the butadiene copolymers used in our process are copolymers of butadiene 1,3 with copolymerisable monethylenically unsaturated monomers, the copolymers may also contain a small proportion, normally not more than 5% by weight of the copolymer, of units derived from a copolymerisable cross-linking monomer containing at least two $>C=C<$ groups per molecule.

The use of our preferred process in which a latex of a synthetic rubber is first selected and the methyl methacrylate and other monomeric ingredients are then dispersed therein, is of particular value where high gel content synthetic rubbers are used, because such rubber cannot normally be easily brought into intimate and uniform contact with methyl methacrylate by other methods.

The dispersed polymer particles resulting from our process are normally solid spherical particles of polymer having a weight average particle size of 50 to 500 microns. They can be separated from the aqueous phase by filtering or by centrifuging and after washing and drying they may be used for moulding purposes in that form. Alternatively, they may be converted to a granular form, e.g. by extruding the powder to form laces or rods and cutting the laces or rods into short lengths. This second stage may be carried out when it is desired to compound the powder with pigment to form a pigmented moulding material.

The moulding powders or granules made according to our invention may be used in the production of many different kinds of useful articles. Because of their particularly good resistance to crazing when brought into contact with aqueous detergents they can be used in the manufacture of such articles as wash hand basins.

Our invention is more particularly described in the following examples in which all parts given are by weight.

*Example I*

An autoclave was charged with the following ingredients:

| | Parts |
|---|---|
| Water | 3,000 |
| Polyvinyl alcohol (73–76% hydrolysed polyvinyl acetate) | 6 |

The mixture was stirred for one hour at room temperature to obtain complete solution after which the following ingredient were added:

| | Parts |
|---|---|
| Benzoyl peroxide | 25 |
| Methyl methacrylate and ethyl acrylate containing in solution a nitrile rubber | 1,000 |

This solution consisted of 920 parts of methyl methacrylate, 30 parts of ethyl acrylate and 50 parts of a butadiene/acrylonitrile copolymer containing 32% acrylonitrile and 68% butadiene residues. The nitrile rubber contained no gel.

The suspension was stirred rapidly and heated to 80° C. When the exothermic reaction subsided (10–25 minutes) the mixture was cooled to room temperature and the polymer granules that were formed were centrifuged, washed and dried.

The product was injection moulded to give pale brown translucent articles with a dull matt surface finish. Blends with pigments were prepared by a normal dry tumble blending process and on being injection moulded the blends gave coloured articles of pleasing pastel shades. All the injection moulded articles made from these products resisted crazing under a accelerated test whereas articles made by injection moulding conventional polymethyl methacrylate moulding powders were severely crazed when subjected to the same test. In this test the mouldings were immersed in a stirred aqueous solution containing 1% of an alkylated phenol-ethylene oxide condensed detergent for 24 hours at 65° C. and then placed in a desiccator for 24 hours.

The products had the following properties:

| | |
|---|---|
| Vicat softening point, ° C. | 108 |
| Flexural modulus, lb./sq. inch at 21° C. | $3.5 \times 10^5$ |
| Hounsfield impact strength, ft. lbs. (notched) | 0.019 |
| Hounsfield impact strength, ft. lbs. (unnotched) | 0.026 |

*Example II*

The procedure of Example I was repeated except that in the place of the nitrile rubber dissolved in the mixture of methyl methacrylate and ethyl acrylate there was used a solution of 100 parts of a 67/33 methyl methacrylate/butadiene copolymer containing zero gel dissolved in a mixture of 870 parts methyl methacrylate and 30 parts of ethyl acrylate. The polymeric products obtained by this process upon injection moulding gave articles which resisted crazing under the accelerated crazing test. The products had the following properties:

| | |
|---|---|
| Vicat softening point, ° C. | 100 |
| Flexural modulus, lb./sq. inch at 21° C. | $4.0 \times 10^5$ |
| Hounsfield impact strength, ft. lbs. (notched) | 0.017 |
| Hounsfield impact strength, ft. lbs. (unnotched) | 0.15 |

*Example III*

An autoclave was charged with water and polyvinyl alcohol as in Example I and the following ingredients were then added:

| | Parts |
|---|---|
| Latex containing 50 parts of 35/65 acrylonitrile/butadiene copolymer highly cross-linked with 0.8% of divinyl benzene. | |
| Methyl methacrylate | 920 |
| Ethyl acrylate | 30 |
| Benzoyl peroxide | 25 |

The temperature of the mixture was raised to 80° C. with stirring; when the polymerisation reaction moderated (10–20 minutes) the polymeric product obtained after centrifuging, washing and drying was injection moulded to give straw coloured translucent articles of good surface finish. These articles resisted crazing under the accelerated test. The polymeric product had the following properties:

Vicat softening point _____107° C.

*Example IV*

An autoclave was charged with water and polyvinyl alcohol as in Example I and the following ingredients were then added:

| | Parts |
|---|---|
| Sufficient latex to contain 70 parts of the polymer used in Example III. | |
| Acrylonitrile | 50 |
| Methyl methacrylate | 880 |
| Benzoyl peroxide | 25 |

After centrifuging, washing and drying a polymeric product similar to that obtained in Example III was obtained having:

Vicat softening point _____104° C.

*Example V*

To a stirred reaction vessel were added the following ingredients:

| | Parts |
|---|---|
| Water | 3,000 |
| Sodium polymethacrylate as a 2% aqueous solution | 4 |
| Methyl methacrylate | 860 |
| Benzoyl peroxide | 23 |
| A polybutadiene rubber latex | 86 |

This latex contained 50% solids and the synthetic rubber contained in its was insoluble in acetone or methyl methacrylate at 20–80° C.

After stirring these ingredients for 2 hours, 2.5 parts of disodium hydrogen phosphate were added and the whole reaction mixture was heated to 80° C. After the initial exothermic reaction had subsided (10–20 minutes) 9 parts of stearic acid were added and the reaction mixture maintained at 95° C. for a further 15 minutes. The mixture was then cooled, centrifuged, washed and dried. Articles made by injection moulding of the polymeric product had a white translucent appearance and resisted crazing by the accelerated crazing test.

*Example VI*

The following ingredients were placed in an autoclave:

| | Parts |
|---|---|
| A solution of methyl methacrylate containing a polyethyl acrylate/acrylonitrile rubber | 484 |
| Stearyl alcohol | 3.5 |
| Benzoyl peroxide | 12.0 |
| Water | 3,000 |
| Disodium hydrogen phosphate | 14 |
| 1% sodium polymethacrylate solution | 160 |
| High molecular weight polyalkylene oxide compound | 0.05 |

The methyl methacrylate solution consisted of 440 parts of methyl methacrylate and 44 parts of a polyethyl acrylate/acrylonitrile copolymer rubber (85/15 ratio).

The mixture was heated under reflux and after 50 minutes the temperature was raised to 100° C. and maintained at this temperature for 10 minutes. The reaction mixture was then cooled, centrifuged, washed and dried. The product was injection moulded to give white opaque articles which were resistant to crazing by the accelerated crazing test. The polymeric product had:

Vicat softening point _____ 110.2° C.

*Example VII*

An autoclave was charged with the following materials:

| | Parts |
|---|---|
| Water | 3,000 |
| Polyvinyl alcohol (hydrolyzed polyvinyl acetate) | 6 |

The mixture was stirred for one hour to obtain thorough mixing and the following were then added:

| | Parts |
|---|---|
| A solution made up of ethyl acrylate (50 parts) methyl methacrylate monomer (870 parts) and 100 parts of a copolymer of ethylene (21 wt.%) and methyl methacrylate (79 wt.%). | |
| Benzoyl peroxide | 25 |

The suspension was stirred rapidly and heated to 80° C. When the reaction subsided (after 10-25 minutes), the mixture was cooled and the polymeric product filtered off, washed and dried. Upon injection moulding, the product gave a colourless translucent moulding having a good surface finish. On exposure to detergent solutions, the moulding did not craze. Other properties of the product were:

| | |
|---|---|
| Vicat softening point, °C. | 106 |
| Flexural modulus, lb./sq. inch at 21° C. | $3.9 \times 10^5$ |
| Hounsfield impact strength, ft. lbs. (Notched) | 0.01 |
| Hounsfield impact strength, ft. lbs. (Unnotched) | 0.09 |

We claim:

Polymethyl methacrylate composition particles, which are substantially spherical in shape and have a weight average particle size of 50 to 500 microns, having reduced tendencies to craze on exposure to aqueous detergents, produced by a suspension polymerization process which comprises stirring methyl methacrylate containing from 0 to 10% by weight of ethyl acrylate in an aqueous phase containing a dispersing agent to form a suspension of droplets of methyl methacrylate in said aqueous phase, there also being present in intimate contact with the suspended monomeric constituents of the system a polymeric material which is selected from the group consisting of polybutadiene homopolymer and rubbery copolymers of butadiene-1,3 with copolymerizable monoethylenically unsaturated monomers, said polymeric material being at least 50% insoluble in methyl ethyl ketone at 20° C. for 24 hours and forming less than 50% by weight of the combined weights of the said polymeric material, methyl methacrylate and ethyl acrylate and maintaining said suspended monomer under polymerization conditions whereby polymerization proceeds within the monomer droplets until polymerization of the monomer is substantially complete.

References Cited by the Examiner

UNITED STATES PATENTS

| 2,943,074 | 6/1960 | Feuer | 260—876 |
| 3,047,534 | 7/1962 | Dyer et al. | 260—879 |
| 3,068,192 | 12/1962 | White | 260—879 |
| 3,177,172 | 4/1965 | Adams | 260—885 |

FOREIGN PATENTS

| 594,733 | 3/1960 | Canada. |
| 778,102 | 7/1957 | Great Britain. |

MURRAY TILLMAN, *Primary Examiner.*

WILBUR L. BASCOMB, JR., SAMUEL H. BLECH,
*Examiners.*

D. J. BREZNER, *Assistant Examiner.*